United States Patent Office 3,746,704
Patented July 17, 1973

3,746,704
IMIDAZOLIDINONES

Willy D. Kollmeyer and Kurt H. G. Pilgram, Modesto, Calif., assignors to Shell Oil Company, New York, N.Y.
No Drawing. Filed May 19, 1971, Ser. No. 145,014
Int. Cl. C07d 49/32
U.S. Cl. 260—240 F
1 Claim

ABSTRACT OF THE DISCLOSURE 1-aralkylamino- and 1 - aralkylideneamino-2-imidazolidinones, and derivatives thereof, such as 1-[(3-trifluoromethyl)benzylideneamino]-2-imidazolidinone, are used as herbicides.

FIELD OF THE INVENTION

This invention relates to novel compounds and their use for controlling the growth of undesirable plants.

DESCRIPTION OF THE PRIOR ART

Snyder and Ebetino, J. Med. Chem., 13, 756 (1970) disclose the preparation of 1-benzylideneamino-2-imidazolidinone and 1-[(5-nitrofurfurylidene)amino]-2-imidazolidinone, a urinary tract antibacterial agent.

Simkover, in U.S. 3,242,044 discloses the use of 1-amino-2-imidazolidinone and the 1-alkylamino and 1-dialkylamino derivatives thereof for insect control. These compounds are inactive as herbicides.

It has now been found that 2-imidazolidinones substituted in the 1-position by an aralkylamino or aralkylideneamino functional group are effective herbicides.

DESCRIPTION OF THE PREFERRED EMBODIMENT

The novel herbicidal compounds of this invention are represented by the generic formula

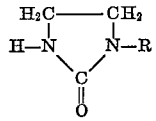

wherein R represents

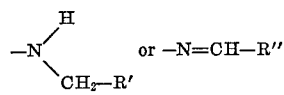

R' being phenyl or a group represented by R'' and R'' being phenyl substituted by one or two of chlorine, bromine, fluorine, alkyl of from 1 to 3 carbon atoms, and/or trifluoromethyl. Also are included the mineral acid salts of these compounds when R is

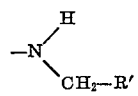

By "mineral acids" are meant sulfuric acid, phosphoric acid, nitric acid, hydrochloric, hydrobromic, hydrofluoric and hydriodic acids. Preferred are the hydrochloric acid salts.

Preferred compounds are those wherein R is

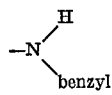

and the HCl salt thereof, or is —N=CHR'', wherein R'' is phenyl substituted by from 1 or 2 chlorine, bromine, methyl, and/or trifluoromethyl groups.

Typical members of this class of herbicides are described and their properties illustrated in the working examples given hereinafter.

Other typical species include:

1-(2-chlorobenzylamino)-2-imidazolidinone
1-(2-fluorobenzylamino)-2-imidazolidinone
1-(2-methylbenzylamino)-2-imidazolidinone
1-[(2-trifluoromethyl)benzylamino]-2-imidazolidinone
1-[(3-trifluoromethyl)-4-chlorobenzylamino]-2-imidazolidinone
1-[(3-trifluoromethyl)-5-chlorobenzylamino]-2-imidazolidinone
1-[(3-trifluoromethyl)-6-chlorobenzylamino]-2-imidazolidinone
1-[(3-trifluoromethyl)-4-chlorobenzylideneamino]-2-imidazolidinone
1-[(3-trifluoromethyl)-5-chlorobenzylideneamino]-2-imidazolidinone
1-[(3-trifluoromethyl)-6-chlorobenzylideneamino]-2-imidazolidinone The compounds of the invention are readily prepared by treating 1-amino-2-imidazolidinone with the appropriate aromatic aldehyde in an alcohol solution, followed by hydrogenation if desired. The 1-amino-2-imidazolidinone is prepared according to the method of Michaels and Gever, J. Am. Chem. Soc. 78, 5349 (1956) and the benzaldehyde is prepared by the method of Filler and Novar, J. Org. Chem., 25, 753 (1960). The manner in which the conversion is carried out is illustrated in the examples set out hereinafter.

In these examples, "parts" means parts by weight unless otherwise expressly indicated, and parts by weight bear the same relationship to parts by volume as does the kilogram to the liter.

In these examples, the structures of the products were established, in each case, by elemental, infra-red spectrum and/or nuclear magnetic resonance analyses.

EXAMPLE I

Preparation of 1-(3-chlorobenzylideneamino)-2-imidazolidinone

To a solution of 7 parts 1-amino-2-imidazolidinone in 200 parts water at 50° C. was added 7 parts 3-chlorobenzaldehyde in 100 parts ethanol. The warm mixture was stirred and allowed to cool at room temperature. Crystalline material began to deposit within 5 minutes. After 1 hour the solid was filtered, washed sparingly with cold ethanol, and dried. Recrystallization of the crude product from 80 parts dimethylformamide gave 45% yield of white crystals, melting at 204–206° C.

EXAMPLES II–V

Using the method of Example I, the imidazolidinones of Table I were prepared.

TABLE I

Compounds of the formula

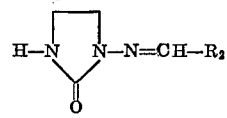

| Example No. | R₂ | Melting point, ° C. |
|---|---|---|
| II | 2,6-dichlorophenyl | 199–201 |
| III | 4-chloropheny | 228–229 |
| IV | 2-chlorophenyl | 206–208 |

EXAMPLE V

Preparation of 1-[3-(trifluoromethyl)benzylidene-amino]-2-imidazolidinone

To a solution of 3.6 parts 1-amino-2-imidazolidinone in 100 parts water at 65° C. was added 4.3 parts 3-(trifluoromethyl)benzaldehyde in 50 parts ethanol. The mixture was stirred overnight without further heating. The white crystals were then filtered and combined with additional product obtained by concentrating the filtrate in vacuo. The total solids were thoroughly washed with water and ether and dried. The yield was 60% and the crystals melted at 176–177° C.

EXAMPLES VI–XXI

Using the method of Example V the imidazolidinones of Table II were prepared.

TABLE II

Compounds of the formula

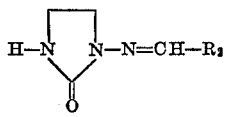

| Example No. | $R_1$ | Melting point, °C. |
|---|---|---|
| VI | 3,4-dichlorophenyl | 181–182 |
| VII | 2-methylphenyl | 223–224 |
| VIII | 4-methylphenyl | 241–243 |
| IX | 3,5-dichlorophenyl | 212–213 |
| X | 2-bromophenyl | 204–205 |
| XI | 3-methylphenyl | 208–209 |
| XII | 4-trifluoromethylphenyl | 214–215 |
| XIII | 3-bromophenyl | 212–213 |
| XIV | 2-trifluoromethylphenyl | 197–198 |
| XV | 3-fluorophenyl | 183–184 |
| XVI | 2,4-dichlorophenyl | 231–232 |
| XVII | 4-fluorophenyl | 231–232 |
| XVIII | 2,5-dichlorophenyl | 181–182 |
| XIX | 2,3-dichlorophenyl | 277–278 |
| XX | 2-fluoro | 215–216 |
| XXI | 4-bromo | 254–255 |

EXAMPLE XXII

Preparation of 1-(benzylamino)-2-imidazolidinone

A Paar hydrogenation bottle was charged with 9.45 parts 1-(benzylideneamino) - 2 - imidazolidinone, 130 parts by volume methanol and 4.0 parts of 10% palladium on charcoal. The bottle was pressurized to 50 pounds per square inch with hydrogen and agitated for 5 hours at room temperature. The catalyst was then removed by filtration. Evaporation of the organic solution gave a solid residue that was recrystallized from ether. There resulted 3.1 parts of crystalline solid having a melting point of 61–64° C.

EXAMPLE XXIII

Reacting the product of Example XXIII with HCl gave the HCl salt, melting point 210–211° C. with decomposition.

EXAMPLE XXIV

The pre-emergence herbicidal activity of compounds of the invention was evaluated by planting seeds of test plants in soil treated with the test compounds at the rate of 17.5 pounds per acre. Seeds of watergrass and cress were planted in treated soil and the planted soil held under controlled conditions of temperature, moisture, and light for 13 to 14 days. The amount of germination then was noted, and the effectiveness of the test compound rated on the basis of a 0 to 9 scale, 0 rating indicating no effect, 9 indicating death of seedlings or no germination. The results are summarized in Table 3. The post-emergence activity of compounds of the invention was evaluated by spraying 10-day old pigweed plants and 7-day old carbgrass plants with a liquid formulation of the test compound at the rate of 10 pounds of test compound per acre. The sprayed plants then were held under controlled conditions of temperature, moisture and light for 10–11 days. The effect of the test chemical then was evaluated visually, the results being rated on a 0 to 9 scale, 0 rating indicating no effect, 9 rating indicating complete kill of the plants. The results are summarized in Table III. The general phytotoxicity of the compounds was evaluated by planting ryegrass and sowthistle plants in culture solutions treated with the test compounds at 10 parts per million solution. The plants were held under controlled conditions of temperature, moisture, and light for 10 to 11 days. The amount of growth of the roots and shoots was noted, and the effectiveness of the test compound was rated on the basis of a 0 to 9 scale, 0 rating indicating no effect, 9 indicating death of the plant. The results are also summarized in Table III.

TABLE III

| Compound of Example | Soil | | | | Solution | | | |
|---|---|---|---|---|---|---|---|---|
| | Pre-emergence | | Post-emergence | | Ryegrass | | Sowthistle | |
| | Water-grass | Cress | Crabgrass | Pigweed | Roots | Shoots | Roots | Shoots |
| I | 9 | 9 | 9 | 7 | 8 | 8 | 8 | 8 |
| II | 9 | 9 | 8 | 9 | 9 | 9 | 9 | 9 |
| III | 9 | 8 | 6 | 6 | 0 | 2 | 0 | 3 |
| IV | 9 | 9 | 8 | 5 | 9 | 9 | 9 | 8 |
| V | 9 | 9 | 9 | 9 | 9 | 9 | 9 | 9 |
| VI | 4 | 9 | 9 | 9 | 6 | 7 | 7 | 7 |
| VII | 9 | 9 | 7 | 4 | 9 | 9 | 9 | 8 |
| VIII | 3 | 8 | 0 | 2 | 0 | 1 | 2 | 1 |
| IX | 3 | 9 | 8 | 7 | 8 | 8 | 7 | 8 |
| X | 7 | 9 | 8 | 9 | 9 | 9 | 8 | 8 |
| XI | 9 | 9 | 8 | 9 | 7 | 7 | 7 | 8 |
| XII | 3 | 9 | 5 | 6 | 3 | 5 | 4 | 4 |
| XIII | 9 | 9 | 9 | 9 | 9 | 9 | 8 | 8 |
| XIV | 8 | 8 | 9 | 9 | 8 | 7 | 8 | 6 |
| XV | 9 | 9 | 9 | 9 | 6 | 6 | 3 | 3 |
| XVI | 6 | 9 | 9 | 9 | 7 | 7 | 7 | 8 |
| XVII | 9 | 9 | 8 | 9 | 0 | 1 | 0 | 2 |
| XVIII | 8 | 9 | 9 | 9 | 8 | 8 | 8 | 7 |
| XIX | 2 | 5 | 0 | 0 | 1 | 2 | 0 | 0 |
| XX | 9 | 9 | 7 | 4 | 9 | 8 | 9 | 9 |
| XXI | 1 | 8 | 4 | 3 | 6 | 6 | 3 | 6 |
| XXII | 8 | 8 | 6 | 7 | 8 | 8 | 8 | 8 |
| XXIII | 9 | 9 | 9 | 8 | 8 | 8 | 9 | 9 |

It is evident from the results of these tests that compounds of the invention are potentially valuable herbicides, some having broad-spectrum activity, whether applied pre-emergence or post-emergence, others being more active applied pre-emergence or post-emergence. Some are effective for controlling nutsedge.

The compounds of this invention are in general solids of very low volatility.

They may be applied as solutions or emulsifiable concentrates in the common organic solvents used in applying herbicides. The compounds of the invention are most readily and effectively applied as herbicides formulated as wettable powders, or as granules for application to soil. Thus, the compound can be adsorbed or absorbed in or on a sorptive carrier, such as finely divided clay, talc, gypsum, lime, wood flour, fuller's earth, kieselguhr, or the like. The solid composition, or dust, may contain from as little as 1% by weight of active material to 75% by weight of active material, or even more. It may be prepared as a dust, or as granules designed to be broadcast or to be worked into the soil. Wettable powders can be prepared suitable for suspension in water with or without the aid of conventional dispersing or deflocculating agents and with or without such adjuvants as oils, stickers, wetting agents, etc.

For field application, the rate of application of the active agent may be varied from about 0.1 to 30 or more pounds per acre. It will be appreciated that the rate of application is subject to variation according to the particular active agent used, the particular species of plants involved, and the local conditions, for example, temperature, humidity, moisture content of the soil, nature of the soil, and the like. Effective resolution of these factors is well within the skill of those well versed in the herbicide art.

The herbicidal compositions may contain one or more of the herbicidal compounds set out hereinbefore as the sole active agent, or they may contain in addition thereto other biologically active substances. Thus, insecticides, e.g., DDT, endrin, dieldrin, aldrin, chlordane, demeton, methoxychlor, DDVP, naled, alpha-methylbenzyl 3-hydroxycrotonate dimethyl phosphate and 3-hydroxy-N,N-dimethyl crotonamide dimethyl phosphate, rotenone and pyrethrum, and fungicides, such as copper compounds, ferbam, captan, and the like, may be incorporated in the compositions. Further, if desired, the herbicidal compositions may contain fertilizers, trace metals, or the like and when applied directly to the soil may additionally contain nematocides, soil conditioners, other plant regulators, such as naphthalene acetic acid, 2,4-dichlorophenoxyacetic acid and the like, and/or additional herbicides of different properties.

I claim as my invention:

1. 1 - [3 - (trifluoromethyl)benzylidene-amino] - 2-imidazolidinone.

References Cited

Jansen et al.: J. Chem. Soc. 1962, pp. 4909 to 4914.

Snyder et al.: Chemical Abstracts, vol. 73, pp. 320–1 (abstract No. 56021g), 1970.

Danchev et al.: Chemical Abstracts, vol. 74, pp. 305–6 (1971), (abstract of Danchev et al., Farmatsiya (Sofia), 1970, No. 20, pp. 1–6).

JOHN D. RANDOLPH, Primary Examiner

U.S. Cl. X.R.

71—92; 424—273; 260—240 A, 309.7